Sept. 2, 1952            H. ORNER            2,608,884
AUTOMATIC TORQUE CONVERTER
Filed July 15, 1948            3 Sheets-Sheet 1

Harry Orner
INVENTOR.

Sept. 2, 1952  H. ORNER  2,608,884
AUTOMATIC TORQUE CONVERTER
Filed July 15, 1948  3 Sheets-Sheet 2

Harry Orner
INVENTOR.

Sept. 2, 1952 — H. ORNER — 2,608,884
AUTOMATIC TORQUE CONVERTER
Filed July 15, 1948 — 3 Sheets-Sheet 3

Harry Orner
INVENTOR.

Patented Sept. 2, 1952

2,608,884

UNITED STATES PATENT OFFICE 2,608,884

AUTOMATIC TORQUE CONVERTER

Harry Orner, Cleveland Heights, Ohio

Application July 15, 1948, Serial No. 38,845

14 Claims. (Cl. 74—730)

1

This invention relates to rotary power transmissions and particularly to such transmissions which transmit power at changeable speed-torque ratios in response to changes in the load.

In this invention, particular use is made of the kinetic energy of an inertia mass rotating at an angular velocity which velocity is increased by moving the inertia mass inwardly toward the center of rotation. For a detailed disclosure of the application of this principle, reference is made to the applicant's application "Rotary Power Transmitting Devices" filed on March 2, 1948, Serial No. 12,553, of which the present application is a continuation in part.

One of the principal objects of this invention is to provide a transmission to transmit rotary power at angular velocities and torques which are variable in response to variations in the load.

Another object of this invention is to provide a novel improved transmission as aforesaid which effects said changes in the angular velocity of the load in a gradual and uninterrupted manner.

Another object of this invention is to provide a novel improved transmission of the character described, in which the characteristics of automatic control are inherent in the power transmitting structure.

Another object of this transmission is to provide a transmission using a fluid coupling mechanism to control the angular velocity of the runner in relation to the impeller to continuously variably change the speed relation of a co-acting differential gear mechanism.

Another object of this invention is to provide a power transmission of the character described, which is adapted to vary the load-power speed ratio over the complete range from 0:1 to 1:1.

Another object of this invention is to provide a transmission to control the angular velocity of the driven shaft in relation to the power drive shaft by continuously changing the moment of inertia of a rotating mass.

Further objects and advantages of the present invention will be apparent from the following detailed description of the embodiments thereof, reference being had to the accompanying drawings for the purpose of illustration only.

In the drawings forming a part of this specification and in which like numerals are employed to designate like parts throughout the same:

Figures 1, 3, 5:
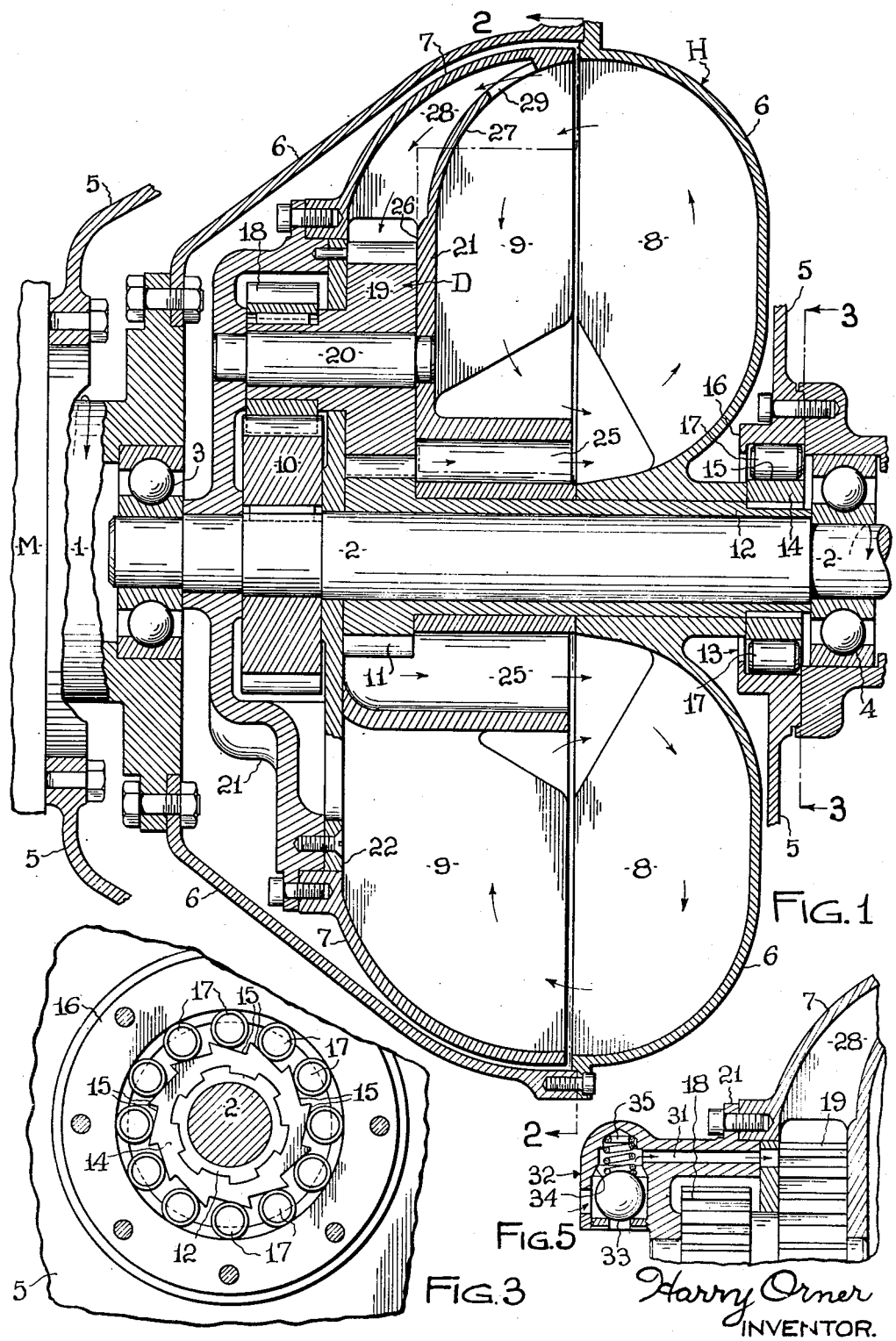
Fig. 1 is a vertical section through a power transmission embodying this invention, taken on line 1—1 of Fig. 2.
Fig. 3 is a sectional view, taken on the line 3—3 of Fig. 1.
Fig. 5 is a fragmentary cross-sectional view of a portion of Fig. 1, illustrating a modified form of my invention.
Figure 2:
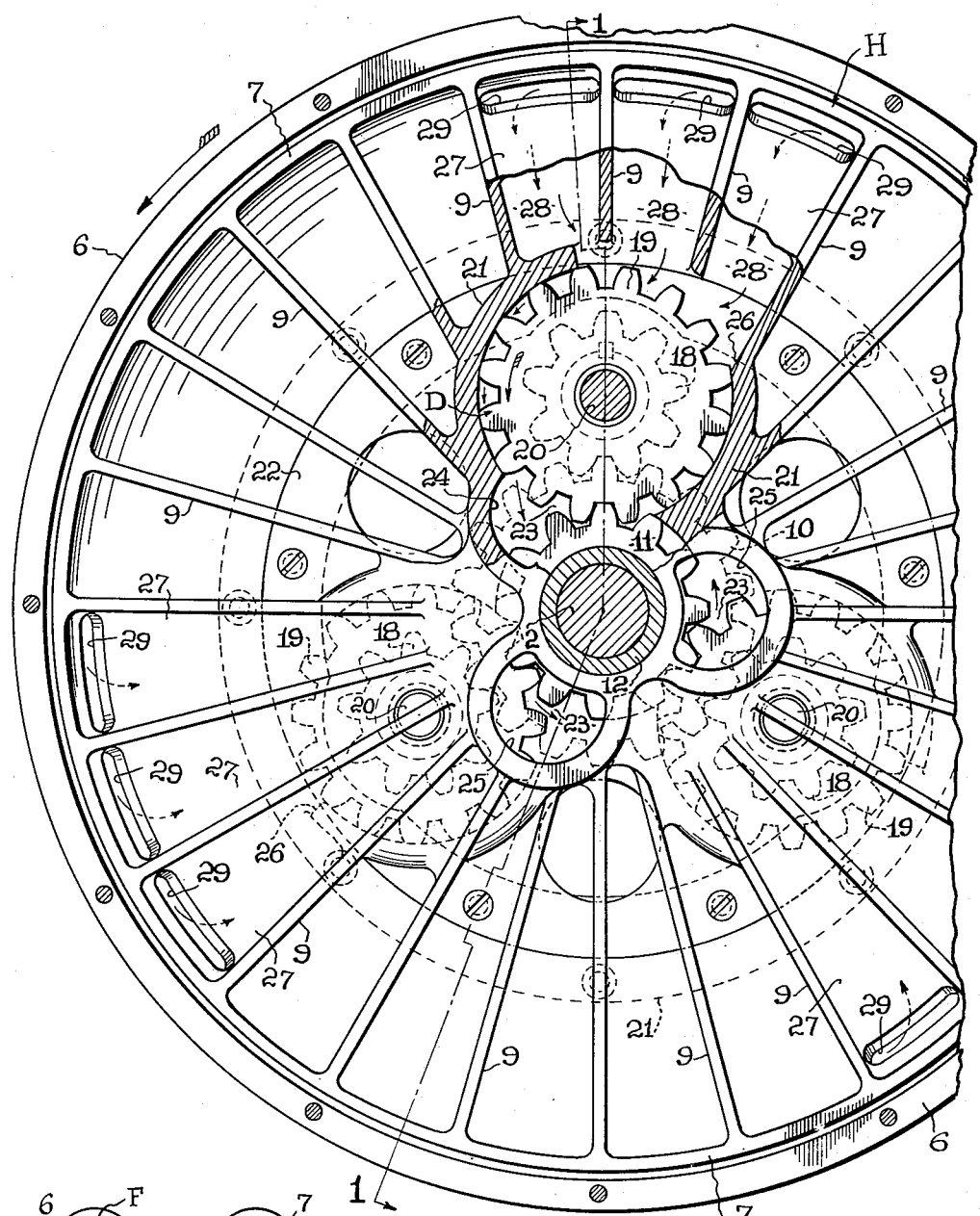
Fig. 2 is a fragmentary vertical section taken on line 2—2 of Fig. 1, with portions thereof broken away to show details of the structure.
Figure 6:
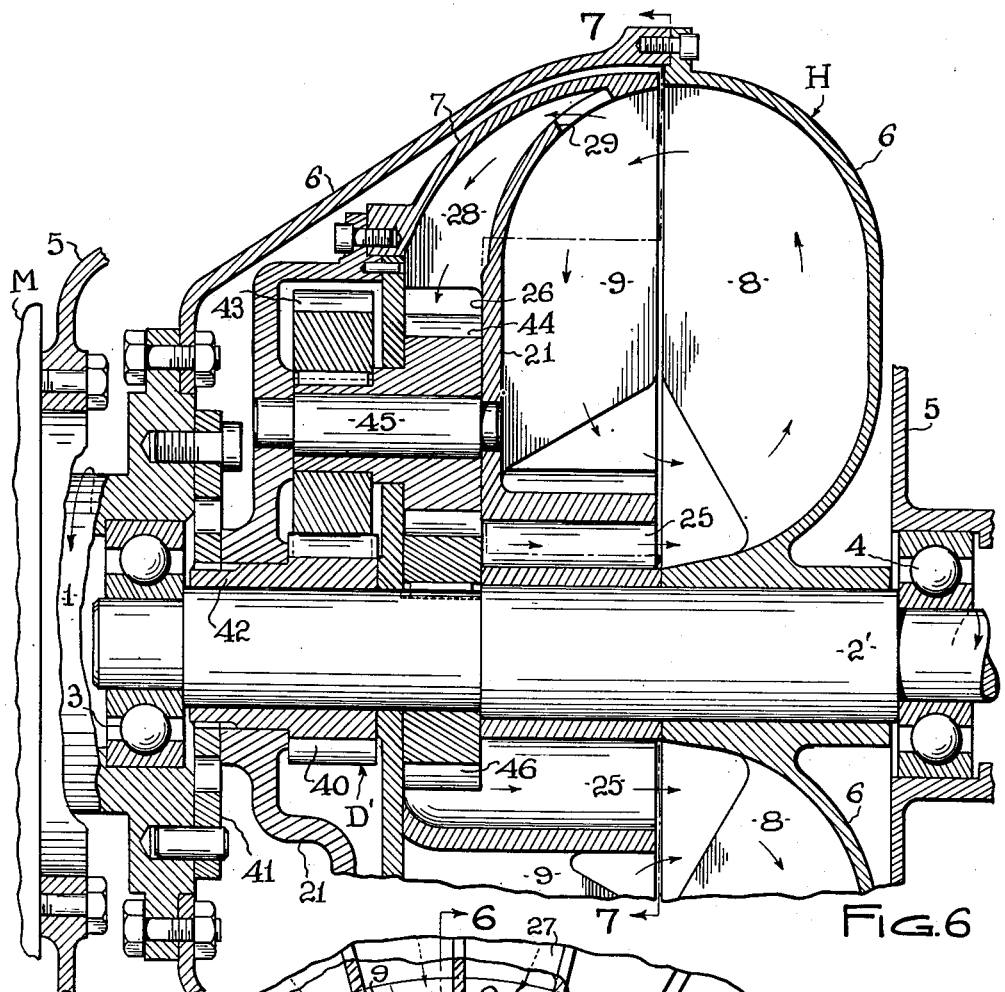
Figure 7:
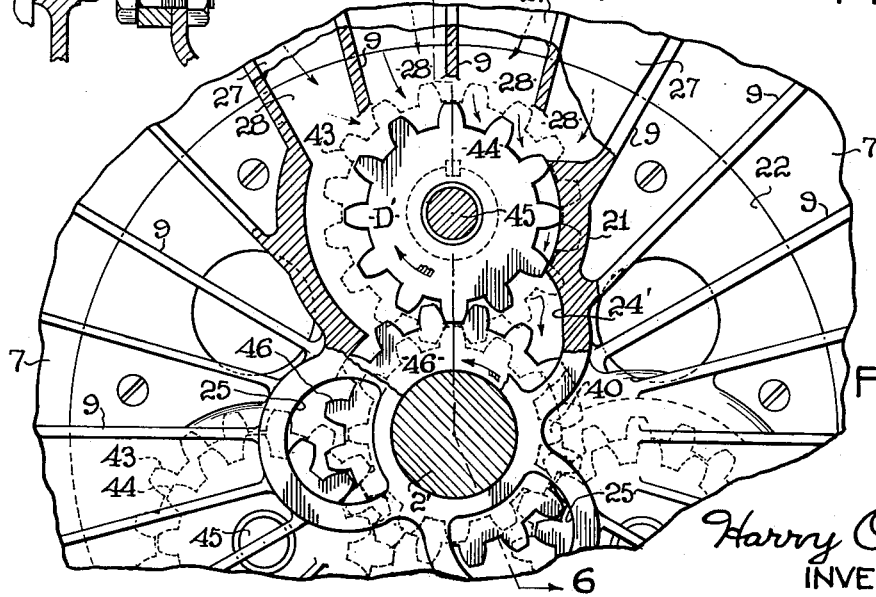

Figs. 6 and 7 are fragmentary views similar to Figs. 1 and 2, respectively, illustrating another embodiment of my invention, in which Fig. 7 is a section taken on line 7—7 of Fig. 6, and Fig. 6 is a section taken on line 6—6 of Fig. 7.

Referring first to Figs. 1, 2 and 3, of the drawings, the reference character 1 indicates a power drive shaft from a source of power M and 2 is a driven shaft provided to drive a variable load (not shown). The shaft 2 is rotatably mounted on both ends in anti-friction bearings 3 and 4. Bearing 3 is mounted in the drive shaft 1, and bearing 4 is mounted in the stationary housing 5. Driven shaft 2 forms a means for supporting a differential gearing mechanism D and a fluid coupling mechanism H. The fluid coupling mechanism H may be of the usual or conventional form well known in the prior art and adapted for use in this invention. For clarity in illustration it is shown here in its simplest form, which includes an impeller 6 bolted directly to the drive shaft 1 in the conventional manner. The runner 7 is mounted to rotate about driven shaft 2, and is rotatable relatively to the impeller 6. Both impeller 6 and runner 7 are provided with a plurality of circumferentially-spaced substantially radial vanes 8 and 9, respectively. Together, the impeller 6 and runner 7 form a torus which is almost completely filled with a working fluid, such as light mineral oil. The fluid takes the directional path shown by the arrows in bringing the angular velocity of runner 7 to a velocity approaching that of the impeller 6 when the impeller is rotated. Due to centrifugal force the fluid moves outwardly on the impeller 6 and gives up its kinetic energy to the runner 7 on which it flows inwardly to complete the operative cycle. As the runner 7 approaches the speed of the impeller 6, the rate of cyclic travel of the fluid diminishes and would cease completely when the runner and impeller are both rotating at the same speed.

The differential gear mechanism D includes a sun gear 10 secured to driven shaft 2, and a smaller sun gear 11 rotatably mounted on driven shaft 2 rearwardly of the gear 10. The gear 11 is provided with an integral sleeve-hub 12 which extends through the fluid coupling mechanism H to the face of bearing 4, and envelopes shaft 2 along a portion of its length.

On the end of the sleeve-hub 12 is mounted a one-way brake 13, illustrated in Fig. 3, including an inner race 14 splined to sleeve-hub 12 of gear 11, and having inclined flats 15; an outer race 16 formed in stationary housing 5; and a plurality of rollers 17 therebetween in such manner as to constitute the mechanism commonly known as an over-running clutch which, in this invention, is used to arrest the reverse rotation of the gear 11 and is therefore referred to as a one-way brake.

Sun gear 10 meshes with a plurality of planet gears 18, and sun gear 11 meshes with a like number of planet gears 19. Each pair of planet gears 18 and 19 are secured together so as to simultaneously rotate on a stub shaft 20 mounted in a rotary housing 21 formed integrally with the runner 7. Any rotation of the runner 7 counterclockwise as indicated in Fig. 2, will transmit rotary motion through the housing 21 to the differential gearing 10, 11, 18 and 19 and thereby to the driven shaft 2 at a reduced speed, the rate of which is dependent on the relative size of the gears. Gear 11, which acts as the reactionary member, is prevented from rotating in a clockwise direction by the one-way brake 13, but is free to rotate in a counterclockwise direction with rotary housing 21 and runner 7.

The planet gears 19 each meshing with sun gear 11 and equally spaced as illustrated in Fig. 2, form three similar units. The sun gear 11 and the planet gears 19 are encased in the rotary housing 21 in such manner as to permit utilization of these meshing gears, not only to transmit rotary power, but also as rotary pumps through the displacing action of the meshing gear teeth. The housing 21 is so fabricated as to enclose the periphery of the sun gear 11 and of each planet gear 19 and they are also encased between the housing 21 and a machined cover plate 22. At each area 23 where the mating teeth of gears 11 and 19 approach engagement, there is a chamber 24 to receive the displaced working fluid. The chamber 24 opens into a passageway 25 which is directed to lead the fluid toward the inner circumference of impeller 6. The passage 25 and chamber 24 are large enough to permit rapid circulation of the fluid away from the pumping gears and thereby the fluid causes no back pressure which would retard the operation of the pumping gears. The housing 21 includes a fluid intake port 26 which is disposed substantially at a position which corresponds to the radially outermost portion of the periphery of each gear 19.

The provision of this rotary pump 11—19 is for the primary purpose of circulating the inertia mass of working fluid of the fluid coupling mechanism H inwardly toward the axis of rotation of the runner 7. This structure includes a wall 27 extending between each of a group of vanes 9 and spaced from the back of runner 7 thereby forming passages 28 which extend from a group of inlets 29 near the outer circumference of the runner 7 to the ports 26 of the pump in rotary housing 21.

The secondary function of rotary pump 11—19 comes about as a direct result of the primary function, in that any pumping action upon the fluid by the gears 11—19 will effect a varying braking action on the rotation of the gears as a result of the pumping load. This pumping load is caused by the centrifugal force due to the angular velocity of the runner 7 moving the fluid in a direction to oppose the force of the fluid pumped by the gears 11—19. This centrifugal force on the fluid forms a head or pumping load on the pumping gears to retard the rotation of the planet gears 19 on their respective axis. As the angular velocity of runner 7 increases this braking action on the planet gears 19 increase. This braking action controls the relative rotation between gears 11 and 19, ranging from no effect on rotation to complete locking of the gears against rotation relatively to each other. Thereby the braking action controls the power transmission ratio between drive shaft 1 and driven shaft 2, which may vary from the high predetermined gear ratio to direct drive, such as occurs when the pumping load causes the gears to be locked against rotation on their respective axes and rotary power is transmitted without speed reduction directly from the runner 7 to driven shaft 2. Reference is made to the applicant's Patents Nos. 2,330,374 and 2,330,375, which disclose this principle.

In the operation of my invention, the fluid coupling mechanism H will function, as do any devices of this type, to transmit kinetic energy by the inertia mass of the working fluid from the power driven impeller 6 to the runner 7, but in addition, in my invention part of the fluid mass is drawn by the meshing teeth of gears 11—19 through inlet 29 and passages 28, through the pumping mechanism consisting of gears 11—19, and discharged into the chamber 24, from which it travels through passage 25 into the inner circle area of the impeller 6. The circulation of the fluid mass is shown by the arrows on Fig. 1, and thus the fluid is moved inwardly toward the axis of rotation to decrease the moment of inertia of the working fluid particles and to thereby increase the angular velocity of these particles. This increased angular velocity is imparted to the walls of vanes 9 on the runner 7, thereby increasing the angular velocity of the runner 7 and the integral housing 21 carrying the planet gears 18 and 19, and through the meshing sun gear 10 would further increase the angular velocity of the driven shaft 2.

The principle of dynamics which underlies the aforesaid result is that the established moment of momentum of a rotating body (sometimes referred to as angular momentum) may be translated into increased angular velocity by changing the configuration of the body in such a way as to decrease its moment of inertia.

Figure 4:
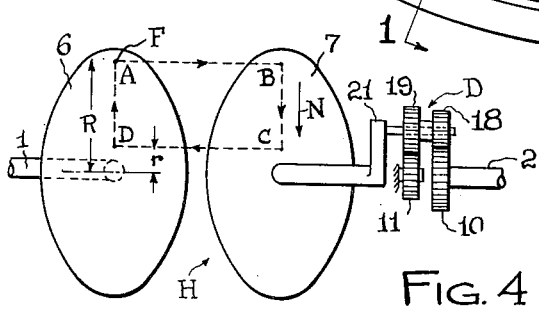
Fig. 4 is a schematic view of my invention to illustrate its function.

Reference is made to the schematic diagram of Fig. 4, which illustrates the drive shaft 1, the impeller 6, the runner 7, the differential gearing mechanism D and the driven shaft 2. Consider one particle of fluid F taking the path A—B—C—D. Suppose the shaft 1 is rotated at an angular velocity $w'$ when particle F is at the position A, at a radial distance R from the axis of rotation of the impeller 6, and that this particle acquires kinetic energy from impeller 6 at the angular velocity of $w'$. It is then transferred to runner 7 to a position B at the radius R, and this particle now on runner 7 will tend to impart its kinetic energy thereon to rotate the runner at angular velocity $w'$. If this particle F is urged or directed by a force N to move along the path B—C on the runner 7 to a position which is at a radial distance $r$ from the axis of rotation, the moment of inertia of the particle is decreased, however, the moment of momentum of this particle remains constant, and hence the angular velocity of the particle must increase to a relative angular velocity $w$, and the velocity of runner 7 is proportionately increased. The particle F is moved back to impeller 6 at the same radial distance $r$ along the path C—D. On the power driven impeller 6 the particle is moved out along the path D—A by centrifugal force to its original position at A. The moment of inertia of particle F is thereby increased and the angular velocity is decreased. The power driven impeller 6 imparts kinetic energy to particle F during this interval to bring it up to the angular velocity $w$ of the impeller at radius R.

$$\text{Moment of momentum} = Iw = I'w'$$
$$= mr^2 w = mR^2 w'$$

I is the moment of inertia at the position of the particle F at radius $r$, and $w$ is the corresponding angular velocity; I' is the moment of inertia at the position at radius R, and $w'$ is the corresponding angular velocity; $m$ is the mass of the particle. The angular velocity varies with the square of the radius thereby permitting a large increase in angular velocity relative to a small change in radius.

The above illustrates the fact that the moment of momentum is not altered when the configuration is changed by a force N which exerts no torque about the axis of rotation. On the other hand, the kinetic energy of the system is changed. The kinetic energy varies as the square of the angular velocity while the moment of momentum varies as the first power of the angular velocity.

$$\text{Kinetic energy} = \frac{Iw^2}{2g}$$

$g$ is the acceleration of gravity unit.

When the particle F is brought back toward the axis of rotation on the runner 7 considerable force N must be exerted. The work done on the system by the movement of the particle F inwardly toward the axis represents the increased kinetic energy which is available to increase the angular velocity of particle F. Since the working fluid is an infinite number of particles F continuously moving along the path A—B—C—D, the above-described action is continuous and the increased angular velocity obtained is dependent on the radial distances $r$ and R, the rate of movement imparted to the particles F by the force N as represented by the pump 9—11 and the mass circulated.

It has thus been demonstrated that kinetic energy may be transmitted by an inertia fluid mass, adaptable to transmit rotary power from the vanes 8 of the impeller 6 to the vanes 9 of the runner 7 by a fluid circuit, and this kinetic energy can be supplemented by the kinetic energy transmitted to the fluid by the pumping gears 11—19. As the runner 7 starts to rotate it will transmit rotary power to the driven shaft 2 at a decreased angular velocity and proportionally increased torque of the predetermined high gear ratio obtained through rotation of gears 11—19—18—10 and the reaction of the one-way brake 13.

It may be desirable, especially in vehicles having internal combustion engines as the source of power M, to vary this drive from a predetermined gear ratio to direct drive in a continuous smooth manner responsive to variations in the load. The primary function of the gears 11—19 is to increase the angular velocity of the runner 7, the secondary function of the gears 11—19 is to decrease the planetary action of the gear train 11—19—18—10 by the referred to braking action. The forces resulting from these functions form a force couple having a variable resultant force which moves the fluid inwardly toward the axis of rotation at a rate dependent on the torque transmitted by the pumping gears and the centrifugal forces acting on the fluid.

Thus a condition is established which acts as an automatic control for the speed-torque relation of power to load. However since the resultant of the couple varies as the square of the angular velocity, it is evident that as the velocity increases linearly, the resultant force will decrease rapidly to pump less fluid and will finally be neutralized by the centrifugal force of the fluid to lock the gears 11—19 before the maximum angular velocity is reached, and thus establish a direct drive relationship. A similar action is known to occur in fluid coupling mechanisms, when, at maximum speed, the couple is locked at a one-to-one relationship.

The vehicle requires the full power of the engine to start it from rest and thereafter requires only a fraction of this power to maintain it in movement. The reactionary force of the one-way brake 13 is decreased proportionally to the decreased power required. This surplus power at this instant can be utilized in the pumping gears of the differential gearing mechanism to exert a dynamic pressure on the vanes 9 of runner 7 by decreasing the moment of inertia of the fluid. This torque on vanes 9 of runner 7 will relieve the power transmission load on gears 10—18—19—11 and reduce the reactionary force of the one-way brake 13. The dynamic pressure causes the transmission to approach the one-to-one speed ratio as the pumping gears 11—19 become loaded by the increased centrifugal force of the inertia fluid.

If at normal running condition, the load is increased, the torque requirement is increased to overcome this load, tending to decrease the angular velocity of the driven shaft 2, thereby decreasing the centrifugal force on the fluid proportionally to the square of the angular velocity (making this action very sensitive) thereby similarly decreasing the pumping load on the pumping gears 11—19 to permit increased relative rotation of the transmitting gears 11—19—18—10 to increase the torque output on the driven shaft 2 through the differential gearing.

This response does not have any hunting or time delay characteristics such as are usual in such controls where forces are required to overcome the inertia of moving parts to establish a balance. Since the control mechanism of this invention is inherent in the structure of the transmitting gears, any change in the condition of power-to-load immediately sets up a requirement of speed-torque characteristics which effects the resultant force of the couple. Any further change of condition before the resultant force can act, will establish a new relative resultant of the couple to immediately assume the burden of the new conditions. Thus an infinite number of changes can be accomplished without losing the smooth continuity of operation.

Thus the gear train 11—19—18—10 acts in three capacities, (1) a power transmitting gear train to transmit rotary power at increased torque, (2) a pump for the fluid inertia mass to decrease its moment of inertia and increase its relative angular velocity, thereby increasing the angular velocity of the runner 7, and (3) to control the torque-speed relationship of the transmission by the resultant force of the couple composed of the torque on the pumping gears and the centrifugal force of the inertia fluid mass which is pumped. The torque transmitted by the gears 11, 19, 18, 10, exert a force on the fluid mass by the intermeshing gear teeth of gears 11, 19, to move the fluid inwardly to the axis of rotation of the runner 7, which is opposed by the centrifugal force of the rotating runner 7 on the fluid mass to move it outwardly from the axis of rotation.

It is of interest to consider the path of the inertia fluid mass in regard to the efficiency of the power transmitted by the device. The conventional fluid mechanism H has through long usage been found to give a very good account of itself for efficiency when not overloaded. In the present invention, overloading possibilities are minimized since before overloading to any appreciable value can occur, the gear train of the differential gearing mechanism D becomes effective. The path of the inertia fluid mass as circulated by the pumping gears 11—19 is a continuous closed path from the runner 7 through the pumping gears, to the impeller 6, and back to runner 7; all kinetic energy retained by the inertia mass of the fluid leaving the runner 7 supplement the forces circulating the fluid outwardly on the impeller 6. Thus, no abrupt retarding or change of direction of the fluid is made to be lost as heat energy.

A transmission is thus provided by this invention to transmit rotary power to a driven shaft, starting the driven shaft from standstill, transmitting at a predetermined gear ratio, and continuously and gradually changing from this predetermined gear ratio to direct drive, with automatic control of the torque-speed relation in response to the load.

In the above form of my invention, the rotary pumping action of the gears 11—19 starts from zero as impeller 6 starts rotating the runner 7, and the fluid mass reaches the inlets 29 at the time the impeller has reached an angular velocity sufficient to start the circuit of the fluid. So at the start, the gears 11—19—18—10 drive the driven shaft at maximum torque relative to the increase of power on the runner to start the load. As the impeller increases in velocity the fluid reaches the inlets 29 at increased rates and the pumping action of the gears increases as the velocity of the runner 7 increases. The control of the power-load starts as the couple of the forces on the pumping gears begins, but the load will prevent the rotation of the runner 7 until sufficient torque is transmitted through the impeller to move it. However, it may be desirable in some cases to permit the runner 7 to reach the maximum value of rotation or approximately one-to-one ratio with the impeller 6 before the primary and secondary actions take place, so that rotary power may be transmitted through the gear train 11—19—18—10 at the maximum torque without the controls functioning until the runner has reached a predetermined angular velocity.

Fig. 5 illustrates a fragmentary view of the housing 21 near the planetary gears 18 and 19, and connecting parts. A passage 31 leads from the area just above the pumping gear 19 through the housing 21 to vent the fluid intake and reduce the effective pumping action of the gears 11—19. On the outer end of the passage 31 is a one-way valve 32 comprising a weighted ball 33 co-acting with a valve seat 34. A compression spring 35 urges the ball inwardly toward the center of rotation of the housing 21 and away from the valve seat 34.

Air or fluid outside of the housing 21 of small kinetic energy is bled to the pumping gears until a predetermined angular velocity of the runner 7, relative to the weight of the ball 33 and the compressibility of the spring 35, to seat the ball 33 on the valve seat 32 by centrifugal force, to obstruct the passage 31, to thereby permit circulation of the fluid inertia mass in the passage 28 as described.

My invention is not limited to a specific planetary gearing arrangement. In Figs. 6 and 7 is illustrated a modified embodiment of my invention, including a different form of planetary gearing arrangement, using the principles of my invention as heretofore described. Figs. 6 and 7 are fragmentary views similar to Figs. 1 and 2, including like parts as indicated by like reference characters. The modification is primarily in the differential gear train D' which includes a sun gear 40 keyed directly to driving shaft 1 by means of an adapter plate 41 bolted to shaft 1 and secured to a splined hub 42 of the gear 40. Sun gear 40 meshes with planet gear 43 which in turn is secured in axial alignment to a planet gear 44 for rotation on a stub shaft 45 mounted in housing 21. Planet gear 44 meshes with a sun gear 46 mounted on drive shaft 2' and keyed thereto. Gears 44—46 act as the pumping gears in the same manner as gears 11—19 of Figs. 1 and 2. A chamber 24' is located at the area where the meshing teeth of the gears 44—46 move toward each other to displace the fluid. In this arrangement the one-way brake 13 of Figs. 1, 2 and 3 may be eliminated.

In operation, the drive shaft rotates the sun gear 40 in a counterclockwise direction to drive the meshing planet gear 43, rotating the integrated planet gear 44, which in turn will tend to drive the sun gear 46 and thus rotate the driven shaft 2' at a reduced speed ratio. In this arrangement of planetary gearing any retarding load on shaft 2' will cause the planet gears 43 and 44 to rotate with the housing 21 in a clockwise direction as the impeller is rotated counterclockwise. Thus the runner 7 will be rotated clockwise as the impeller 6 rotates counterclockwise, thereby imparting no rotational motion to the driven shaft 2' through the planetary gearing. When the angular velocity of the impeller 6 is increased, the inertia fluid mass will circulate to runner 7 and curb its clockwise rotation, thereby causing the rotary power of drive shaft 1 to be partially diverted into the gear train 40—43—44—46. As the counter-rotation of the runner 7 is further retarded, the angular velocity of the shaft 2' is continuously increased to drive the load.

When the velocity of the impeller 6 and the rate of circulation of the fluid mass have reached a value at which the counter-rotation of the runner 7 is completely arrested, the drive shaft 1 will drive the driven shaft 2' at a reduced ratio and at increased maximum torque. At this instant the inertia fluid mass as circulated by the impeller will act as the reactionary member, functioning like the one-way brake 13 of Fig. 1. The impeller 6 continues to circulate the fluid inertia mass to the runner 7 and the decrease in the moment of inertia of the fluid particles by the action of the pumping gears 44—46 occurs so as to increase the angular velocity of the runner 7 to a speed approaching the angular velocity of the impeller 6. The secondary or braking function of the gears as described in my first embodiment, is effective similarly in the present embodiment to control the power-load relation by the variable torque-speed relation established by the transmission. The torque transmitted through the gears 44, 46 will exert a force on the fluid mass inwardly to the axis of rotation of runner 7, which will be opposed by the centrifugal force due to the angular velocity of runner 7 on the fluid mass. As the angular velocity of runner 7 increases, the centrifugal force will increase the pumping load on the pumping gears 44, 46, thus retarding the gear train 40, 43, 44, 46 to drive the driven shaft 2' at an increased angular velocity.

Thus a second embodiment of my invention is illustrated using a different form of planetary gearing arrangement to cause the drive shaft 1 to drive the driven shaft 2' from standstill through a predetermined gear reduced speed ratio, and continuously and gradually changing from the predetermined gear ratio to direct drive in a smooth manner, with automatic control of the torque-speed relationship in response to the load.

In numerous respects, as is apparent, my invention is not limited to the exact details of construction illustrated and described. Various changes and modifications may be made, without departing from the spirit of my invention or the scope of the appended claims.

Having thus described my invention, I claim:

1. In a rotary power transmission device, the combination of a driving member, a driven member, an epicyclic gear train including power transmitting meshed gears interconnecting said members at a predetermined gear ratio, a fluid mass rotatable with said members adapted to be displaced toward the axis of rotation by means actuated by the gears in said gear train, whereby a work load is imposed on said gear train by the centrifugal force of said fluid mass relative to its angular velocity, and means for increasing the angular velocity of said driven member in response to increases in force on the fluid mass by the centrifugal force relative to the increase of angular velocity thereon.

2. In a rotary power transmission device, the combination of a driving shaft, a driven shaft, a fluid coupling, including an impeller, a runner and a circulatory fluid mass, said impeller being secured to said driving shaft for unitary rotation therewith, an epicyclic gear train, including planet gears and sun gears and a one-way brake on an element of said epicyclic gear train, said gear train providing a power transmission path between said runner and said driven shaft, said planet gears being rotatably mounted on said runner for unitary planetary rotation therewith, whereby rotation of said runner causes planetary rotation of said planet gears, and means comprising a fluid pumping circuit power actuated by said gear train for continuously increasing the work load on said gear train in response to increased angular velocity of said runner for varying the effective head of fluid pumped whereby to retard the axial rotation of said planet gears.

3. A combination, as defined in claim 2, in which said fluid pumping circuit actuates said fluid toward the axis of rotation of said runner, whereby to increase the acceleration of said runner by the change of the moment of inertia of the fluid.

4. In a power transmission, a driving and driven shaft interconnected through a differential gearing comprising rotatable meshed gears, means to brake the rotary motion of the differential gearing in a direction to cause the driving shaft to drive the driven shaft at a predetermined gear ratio, a pump and a fluid disposed to be pumped in a circuit by said pump, means cooperative with said differential mechanism to direct the flow of said pumped fluid inwardly toward the axis of rotation of said differential mechanism to thereby exert a load braking action on the gears, and means to variably control the rate of transmission operative in response to a relation of torque transmitted by the differential mechanism effecting said fluid flow and centrifugal force on the pumped fluid relative to the velocity transmitted.

5. In a power transmission, a fluid coupling including a driven impeller, a runner adaptable to drive a load, a fluid inertia mass co-acting between said impeller and runner to transmit kinetic energy therebetween, a differential gearing mechanism comprising rotatable meshed gears, said runner acting on an element of said differential mechanism to transmit rotary power by the gears of the differential gearing mechanism, said fluid inertia mass disposed to be pumped by meshed teeth of the gears of the differential mechanism toward the axis of rotation of the runner.

6. In a transmission, a differential geering mechanism including power transmitting intermeshing gears, a power drive member, a fluid inertia mass adapted to be circulated from said drive member to a driven member co-acting with an element of the differential gearing mechanism and supplemented by a pumping means actuated by the differential gearing mechanism, said fluid being circulated in a direction to decrease the moment of inertia of the fluid particles on the driven member, and thereby to increase the angular velocity of said element whereby to vary the rate of power transmission of the differential gearing mechanism.

7. In a power transmission, a fluid coupling including a driving impeller, a runner adapted to drive a load, a fluid inertia mass co-acting between said impeller and said runner to transmit kinetic energy therebetween, a differential gearing mechanism including power transmitting intermeshing gears, said runner coacting with an element of said differential gearing mechanism to control the rotational velocity of the differential gearing mechanism, power actuated means to circulate said fluid inertia mass inwardly toward the axis of rotation of the runner, to control the angular velocity of the runner and said element.

8. In a power transmission, a differential gearing mechanism comprising a one-way brake and rotatable intermeshed gears adapted to transmit rotary power by the intermeshing gears from a predetermined gear ratio to direct drive, means to change the ratio of transmission of the differential gearing mechanism including an inertia mass and a rotary power driven member, said inertia mass adapted to transmit rotary kinetic energy from said power driven member to a rotary element of the differential gearing mechanism, power means to move said inertia mass inwardly toward the axis of rotation of said element to increase the angular velocity of said element.

9. In a power transmission, a fluid coupling including an impeller, a runner and a working fluid adapted to transmit rotary power by its inertia mass, said runner and a driven shaft interconnected through a differential gearing mechanism including intermeshing gears, a one-way brake on an element of the differential mechanism to cause the runner to drive the driven shaft by the gears at a predetermined speed ratio, said working fluid circulating in a fluid circuit, said circuit including a pumping means actuated by the differential gearing mechanism and the runner, said fluid circuit being in a direction to decrease the moment of inertia of said fluid and relatively increase its angular velocity.

10. In a power transmission, a fluid coupling consisting of an impeller, a runner, and a working fluid transmitting kinetic energy therebetween by its inertia mass in a circuit moved inwardly on the runner and outwardly on the impeller, a differential gearing mechanism including intermeshing gears adapted to transmit variable rotary velocity by the gears relative to the differential rotary motion of the gears from a predetermined gear ratio to direct drive, means to control the angular velocity of the gears including a fluid circuit actuated by the gears of the differential gearing mechanism whereby to supplement circulation of said inertia fluid.

11. In a power transmission, a fluid coupling including a driving impeller, a runner adapted to drive a load, a fluid transmitting kinetic energy therebetween by its inertia mass in a circuit moved inwardly on the runner and outwardly on the impeller, a differential gearing mechanism comprising rotatable meshed gears adapted to transmit rotary power, said fluid circuit including power means actuated by the differential gearing mechanism to further maintain the said fluid circuit.

12. In a power transmission, a fluid coupling including a driving impeller, a runner, and a fluid inertia mass co-acting between said impeller and runner to transmit kinetic energy therebetween, a differential gearing mechanism comprising rotatable meshed gears, said runner acting on an element of said differential mechanism to transmit rotary power by the gears of the differential gearing mechanism, said fluid disposed to be pumped by power means actuated by the differential mechanism toward the axis of rotation of the runner, and actuated by the centrifugal force of the rotating runner to retard the pumping action.

13. In a power transmission, a fluid coupling including an impeller, a runner, and a fluid inertia mass to transmit kinetic energy therebetween by its inertia mass in a circuit moving inwardly on the runner and outwardly on the impeller, a differential gearing mechanism, said runner co-acting with an element of said differential gearing mechanism to transmit rotary power through the differential gearing mechanism, power actuated means to further circulate said fluid inertia mass inwardly toward the axis of rotation of said runner.

14. In a power transmission, a fluid coupling including an impeller, a runner, and a fluid inertia mass circulated therebetween to transmit kinetic energy from the runner to the impeller, a differential gearing mechanism including a gear rotatable with a driven shaft, planet pinions mounted to rotate on said runner, a second gear, a one-way brake on said second gear to cause the runner to drive the driven shaft through the differential gearing mechanism at a predetermined gear ratio, said fluid disposed to be pumped by one of said gears and a meshed planet pinion to supplement the circulation of said fluid in said fluid coupling.

HARRY ORNER.

REFERENCES CITED

The following references are of record in the file of this patent:

UNITED STATES PATENTS

| Number | Name | Date |
|---|---|---|
| 1,203,265 | Radcliffe | Oct. 31, 1916 |
| 1,242,974 | Pinckney | Oct. 16, 1917 |
| 1,473,487 | McCarthy | Nov. 6, 1923 |
| 1,752,385 | Johnson | Apr. 1, 1930 |
| 1,764,849 | O'Connor | June 17, 1930 |
| 2,129,884 | Swan | Sept. 13, 1938 |
| 2,183,403 | Mitchell | Dec. 12, 1939 |
| 2,227,336 | Jamieson-Craig | Dec. 31, 1940 |
| 2,240,650 | Heyer | May 6, 1941 |
| 2,301,292 | Krick | Nov. 10, 1942 |
| 2,330,375 | Orner | Sept. 28, 1943 |

FOREIGN PATENTS

| Number | Country | Date |
|---|---|---|
| 414,654 | Great Britain | Aug. 7, 1934 |
| 450,953 | Great Britain | Apr. 24, 1935 |
| 514,323 | Great Britain | Nov. 6, 1939 |